Figure 1:
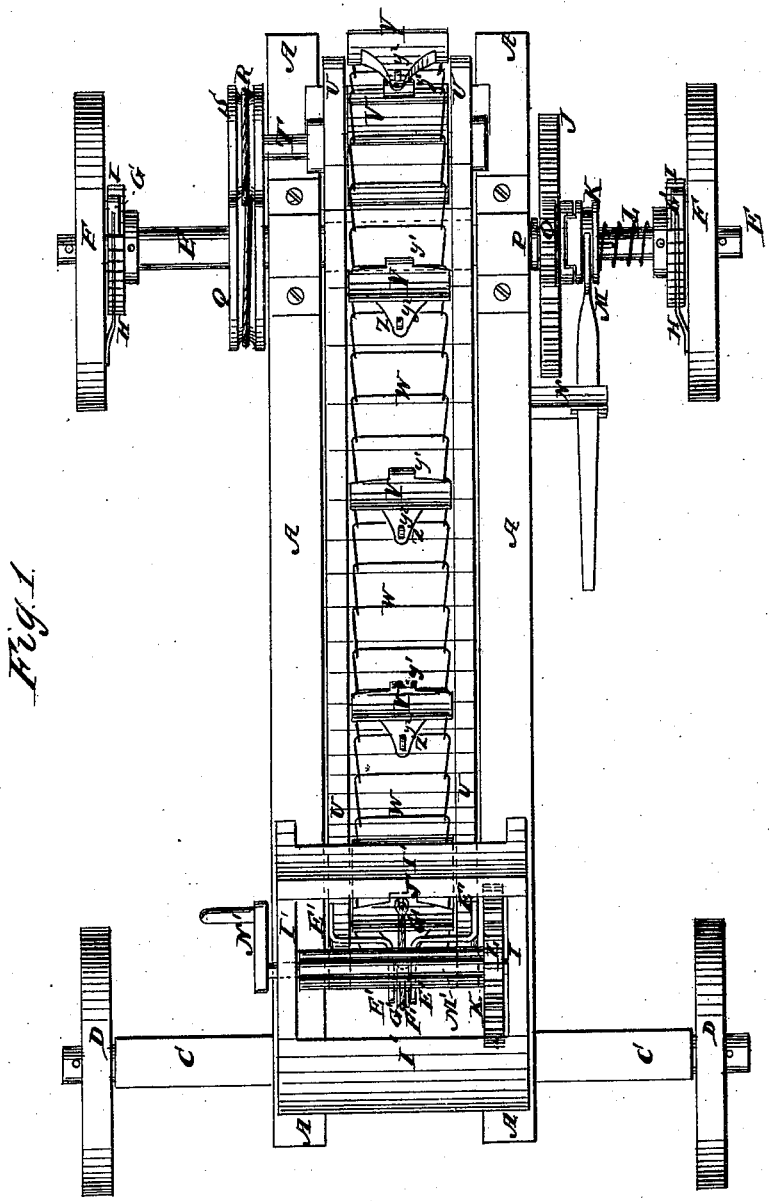

2 Sheets—Sheet 1.

J. E. LANDRUM.
DITCHING-MACHINE.

No. 170,631. Patented Nov. 30, 1875.

WITNESSES:
E. Wolff.
Alex F. Roberts

INVENTOR:
J. E. Landrum
BY Munn
ATTORNEYS.

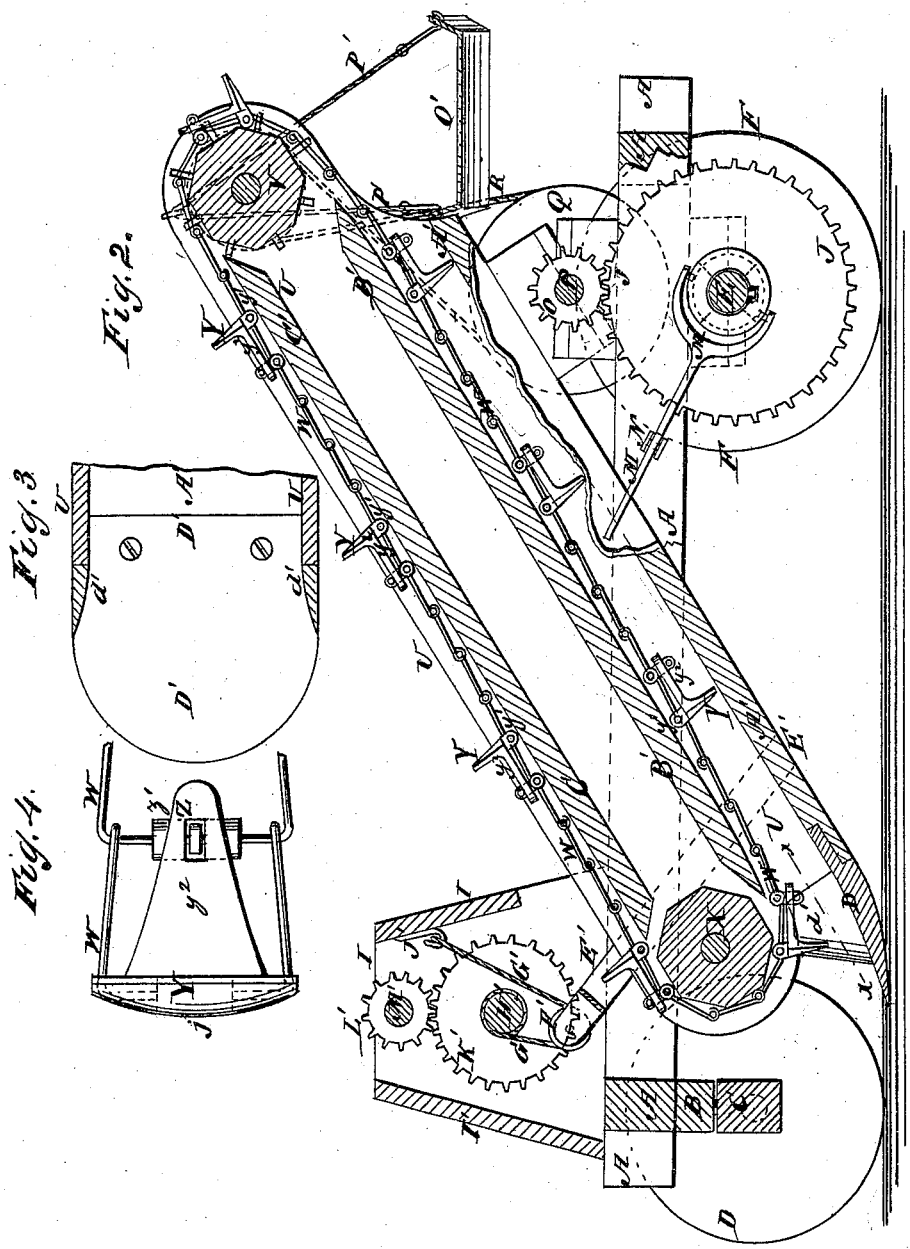

UNITED STATES PATENT OFFICE.

JOHN E. LANDRUM, OF HEBRON, OHIO.

IMPROVEMENT IN DITCHING-MACHINES.

Specification forming part of Letters Patent No. 170,631, dated November 30, 1875; application filed October 29, 1875.

*To all whom it may concern:*

Be it known that I, JOHN E. LANDRUM, of Hebron, in the county of Licking and State of Ohio, have invented a new and useful Improvement in Ditching-Machines, of which the following is a specification:

Figure 1, Sheet 1, is a top view of my improved ditching-machine. Fig. 2, Sheet 2, is a vertical longitudinal section of the same. Fig. 3, Sheet 2, is a detail section of the point or cutter and the lower end of the spout, taken through the line $x\,x$, Fig. 2. Fig. 4, Sheet 2, is a detail view of one of the hoes and a part of the endless chain.

Similar letters of reference indicate corresponding parts.

The object of this invention is to furnish an improved machine for opening tile ditches, which shall be simple in construction, convenient in use, and reliable in operation.

The invention consists in the hoe formed of the plate, provided with a slotted shank and a socket, and the perforated lug provided with a socket, in combination with two adjacent links of an endless chain; in the combination of the straps, the pulley, the rope or chain, the shafts, the gear-wheels, and the frame with the forward end of the elevator box or spout and the forward end of the main frame; and in the combination of the suspended spout and the suspending-chains with the rear end of the elevator box or spout, and with the hoes of the endless chain, as hereinafter fully described.

A is the main frame, which is formed by attaching the ends of two long side bars to the ends of two short cross-bars. The forward end of the frame A is attached to a short bolster, B, which rests upon the forward axle C, and the frame and bolster are pivoted to said axle by the king-bolt. The axle C is made long, and upon its journals revolve the forward wheels D. E is the rear axle, which is made long, and revolves in bearings attached to the lower sides of the rear part of the side bars of the frame A. Upon the journals of the axle E revolve the rear wheels F, the faces of which are toothed or spurred to prevent them from slipping upon the ground. The axles C E are made so long that the wheels D F may run upon the opposite sides of the ditch, and at a proper distance from its edges. The faces of the wheels D F are made wide to prevent them from sinking into the ground. To the inner sides of the rear wheels F are pivoted pawls G, which are held down to their work by springs H, also attached to said wheels F. The engaging ends of the pawls G rest upon the teeth of the ratchet-wheels I, which are rigidly attached to the axle E at the inner sides of the wheels F, so that the wheels F may carry the axle E with them in their revolution when turned forward, but may be turned backward without turning the said axle E. J is a large gear-wheel, which runs loosely upon the axle E. K is a clutch, which slides upon the axle E, and is held up against the gear-wheel J, to cause the axle E to carry the said gear-wheel J with it by a spring, L, placed upon the axle E. The clutch K is grooved to receive the forked end of the lever M, which is pivoted to a stud, N, attached to the frame A, so that by operating the lever M the gear-wheel J may be thrown out of gear with the axle E when desired. The teeth of the large gear-wheel J mesh into the teeth of the small gear-wheel O, attached to the end of the shaft P, which revolves in bearings attached to the upper side of the rear part of the side bars of the frame A, and in bearing attached to the bottom of the spout of the elevator near its upper or rear end. To the other end of the shaft P is attached a chain-wheel, Q, around which passes an endless chain, R. The chain R is crossed, and passes around another chain-wheel, S, attached to the end of the shaft T, which revolves in bearings in the upper or rear ends of the side plates U of the elevator. To the shaft T, between the side plates U of the elevator, is attached an octagonal roller, V, around which passes an endless chain, W, and which is provided with spurs to take hold of the links or bars of the chain W, and carry it forward. The chain W also passes around a similar octagonal roller, X, pivoted to and between the lower or forward ends of the side plates U. The links of the chain W are formed of rods, the end parts of which are bent forward nearly at right angles, and the ends of each following link are bent around the body of the preceding link, and are welded. Y are the hoe-plates, upon the rear edge of which is formed a socket, $y^1$, to receive the middle part of the links of the chain W. Upon the base of the hoes Y is formed a shank, $y^2$, of such a length as to reach to the next link, and its forward end is slotted to receive the lug Z, provided with a socket, $z'$, placed upon the said next link. The lug Z has a hole formed through it to receive a small wooden pin, of such a size as to hold the hoe to its work under ordinary circumstances, but which, should the hoe strike a stone or other obstruction, will break and allow the hoe to swing back to prevent it from being broken. To and between the lower edges of the side plates U is secured a plate, A', to serve as an apron for the dirt to be carried up upon by the hoes Y. To and between the side plates U is secured a plate, B', at such a distance above the plate A that the sockets of the hoes Y may bear against it while the said hoes are carrying the dirt up the plate A'. To and between the plates U, at a little distance below their upper edges, is secured a plate, C', for the sockets of the hoes Y to rest upon while passing down from the upper roller V to the lower roller X. The outer surfaces of the plates B' C' should be at a distance apart equal to the diameter of the rollers V X, so that the endless chain W may be kept from sagging, and held straight while passing from the one to the other of said rollers. The lower part of the rear end of the elevator spout or box is cut away, as shown in Fig. 2, so that the dirt may drop from the rear end of the plate A' before the hoes Y begin to rise to pass around the pulley V. The lower part of the forward end of the elevator box or spout is cut away to receive and fit upon the cutter D'. The upper side of the forward end of the plate A' is rabbeted to fit into a rabbet formed in the under side of the rear end of the cutter D', and the said cutter is secured in place detachably by bolts. The plate of the cutter D' is beveled off upon the lower side of its forward end to bring it to an edge, and has vertical flanges $d'$ formed upon its sides, which are beveled off upon the inner sides of their forward parts to bring them to an edge. A set of three or more cutters, D', should be used, having the lower sides beveled at different angles, so that they may be changed as the ditch increases in depth, to keep the edge of the cutter at a proper working angle with the surface of the ground at the bottom of the ditch. To the sides of the lower ends of the side plates U are attached bars E', the upper ends of which are bent inward at such a distance above the upper edges of said side plates U as not to interfere with the passage of the hoes Y, and to and between said ends is pivoted a pulley, F'. G' is a rope or chain, which passes around the pulley F', and one of its ends is attached to a shaft or drum, H', which is pivoted to a frame, I', attached to the forward end of the frame A. The other end of the rope or chain G' is attached to a hook, J', also attached to the frame I'. To the shaft H' is attached a gear-wheel, K', the teeth of which mesh into the teeth of the gear-wheel L', attached to the shaft M'. The shaft M' is pivoted to the frame I', and to one of its ends is attached a crank, N', so that by turning the said crank the forward end of the elevator may be lowered or raised, as may be desired.

One of the shafts H' M' should be provided with a ratchet-wheel and pawl, to hold the forward end of the elevator in place when adjusted.

In using the machine it is drawn back and forth along the line of the ditch, and the forward end of the elevator is lowered at each passage from one to four inches, according to the character of the soil. As the dirt falls from the rear end of the plate A' it is received upon a spout, O', suspended by chains P' from the rear end of the elevator-box at such an inclination that the dirt may slide down it, and made of such a length as to deposit the dirt at such a distance from the ditch that it will not fall back into said ditch. The spout O' may be so formed as to deposit the dirt upon one or both sides of the ditch.

Having thus described my invention, I claim as new and desire to secure by Letters Patent—

1. The hoe formed of the plate Y, provided with a slotted shank, $y^2$, and a socket, $y^1$, and the perforated lug Z, provided with a socket, $z'$, in combination with two adjacent links of the endless chain W, substantially as herein shown and described.

2. The combination of the straps E', pulley F', rope or chain G', shafts H' M', gear-wheels K' L', and frame I' with the forward end of the elevator box or spout U A' B' C', and the forward end of the main frame A, substantially as herein shown and described.

3. The combination of the suspended spout O' and the suspended chains P' with the rear end of the elevator box or spout U A' B' C', and with the hoes Y $y^1$ $y^2$ Z $z'$ of the endless chain W, substantially as herein shown and described.

JOHN E. LANDRUM.

Witnesses:
 WILLIAM H. PALMER,
 HAMLIN D. BURCH.